(12) United States Patent
Tsai et al.

(10) Patent No.: US 9,202,403 B2
(45) Date of Patent: Dec. 1, 2015

(54) PIXEL CIRCUIT CAPABLE OF DETERMINING DISPLAYED GRAY SCALE AND METHOD FOR DRIVING THE SAME

(75) Inventors: Meng-Ju Tsai, Kaohsiung (TW); Yu-Sheng Huang, Kaohsiung (TW); Chia-Lun Chiang, Keelung (TW); Yan-Ciao Chen, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 332 days.

(21) Appl. No.: 13/615,531

(22) Filed: Sep. 13, 2012

(65) Prior Publication Data

US 2013/0235091 A1 Sep. 12, 2013

(30) Foreign Application Priority Data

Mar. 9, 2012 (TW) .............................. 101108143 A

(51) Int. Cl.
*G09G 5/10* (2006.01)
*G09G 3/00* (2006.01)
*G09G 3/36* (2006.01)
*H04N 13/04* (2006.01)

(52) U.S. Cl.
CPC .............. *G09G 3/003* (2013.01); *G09G 3/3648* (2013.01); *G09G 3/3659* (2013.01); *H04N 13/0452* (2013.01); *H04N 13/0497* (2013.01); *G09G 2300/0447* (2013.01); *G09G 2300/0814* (2013.01); *G09G 2300/0852* (2013.01); *G09G 2320/028* (2013.01); *G09G 2320/0209* (2013.01)

(58) Field of Classification Search
USPC ...................................... 345/690, 204; 349/38
See application file for complete search history.

(56) References Cited

U.S. PATENT DOCUMENTS

| 7,158,201 B2 * | 1/2007 | Kim et al. ...................... 349/129 |
| 7,940,346 B2 * | 5/2011 | You et al. ......................... 349/48 |
| 8,456,583 B2 | 6/2013 | Shimoshikiryoh et al. |
| 2006/0215066 A1 * | 9/2006 | Ueda et al. ....................... 349/38 |
| 2010/0007594 A1 | 1/2010 | Lai et al. |
| 2010/0103339 A1 * | 4/2010 | Shimoshikiryoh et al. ..... 349/39 |
| 2010/0220116 A1 | 9/2010 | Liao et al. |
| 2012/0320099 A1 | 12/2012 | Wu et al. |
| 2013/0250198 A1 | 9/2013 | Shimoshikiryoh et al. |

FOREIGN PATENT DOCUMENTS

| CN | 101636690 | 1/2010 |
| CN | 102231256 | 11/2011 |

OTHER PUBLICATIONS

"Office Action of China Counterpart Application", issued on Apr. 30, 2014, p. 1-p. 6.

* cited by examiner

*Primary Examiner* — Kwang-Su Yang
(74) *Attorney, Agent, or Firm* — Jianq Chyun IP Office

(57) ABSTRACT

A pixel circuit is provided. The pixel circuit is electrically coupled to a data line, a first scan line, and a second scan line. The pixel circuit includes a first pixel unit, a second pixel unit, and a third pixel unit. The first pixel unit is electrically coupled to the data line and the second scan line, to determine a first displayed gray scale of the first pixel unit. The second pixel unit is electrically coupled to the data line and the first scan line, to determine a second displayed gray scale of the second pixel unit. The third pixel unit is electrically coupled to the data line, the first scan line, and the second scan line, to determine a third displayed gray scale of the third pixel unit.

11 Claims, 5 Drawing Sheets

US 9,202,403 B2

PIXEL CIRCUIT CAPABLE OF DETERMINING DISPLAYED GRAY SCALE AND METHOD FOR DRIVING THE SAME

CROSS-REFERENCE TO RELATED APPLICATION

This application claims the priority benefit of Taiwan application serial no. 101108143, filed on Mar. 9, 2012. The entirety of the above-mentioned patent application is hereby incorporated by reference herein and made a part of this specification.

BACKGROUND

1. Field of the Invention

The invention generally relates to a pixel circuit and a method for driving the same. More particularly, the invention relates to a pixel circuit for displaying a two-dimensional (2D) image and a three-dimensional (3D) image and a method for driving the pixel circuit.

2. Description of Related Art

In recent years, as display technology continuously advances, users have become more and more demanding on display quality, e.g., image resolution, color saturation, and so forth. In process of purchasing a display, whether the display is able to display a 3D image or not is also taken into consideration in addition to high image resolution and high color saturation. Since the technology for rendering a 3D image has not yet been widely adopted, the 3D image is not as common as the 2D image; namely, most video and image sources are 2D. In order for a display not to be subject to different video and image sources, some manufacturers have developed a certain display that can switch between a 2D-image display mode and a 3D-image display mode.

To resolve a color washout issue of displayed images, one single pixel of a display panel may be divided into a plurality of display blocks, so as to compensate the color washout effect at different viewing angles. On the other hand, to display a 3D image without encountering a cross-talk problem, some of the display blocks in one single pixel may serve as shielding blocks. Thereby, when the 3D image is being displayed, the number of the display blocks in one single pixel for resolving the color washout issue may be reduced. That is to say, in the process of displaying the 3D image, the color washout issue and the cross-talk problem may not be effectively resolved at the same time.

SUMMARY

The invention provides a pixel circuit that is equipped with a plurality of pixel units. The pixel units are coupled to one single data line to determine a plurality of displayed gray scales for a plurality of display blocks, and thereby the color washout issue arising from displaying an image may be resolved.

According to an embodiment of the invention, a pixel circuit that is electrically coupled to a data line, a first scan line, and a second scan line is provided. The pixel circuit includes a first pixel unit, a second pixel unit, and a third pixel unit. The first pixel unit is electrically coupled to the data line and the second scan line, so as to determine a first displayed gray scale of the first pixel unit. The second pixel unit is electrically coupled to the data line and the first scan line, so as to determine a second displayed gray scale of the second pixel unit. The third pixel unit is electrically coupled to the data line, the first scan line, and the second scan line, so as to determine a third displayed gray scale of the third pixel unit.

A driving method applicable for the aforementioned pixel circuit is provided. The method comprises inputting a display signal to the data line, so as to provide a first displayed level to the second pixel unit and the third pixel unit within a first time period and provide the second displayed level to the first pixel unit within a second time period, wherein the second time period is following the first time period.

Another method for driving the aforementioned pixel circuit is also provided. The method comprises: inputting a first gate signal to the first scan line, so as to enable the second pixel unit and the third pixel unit within a first time period; inputting a second gate signal to the second scan line, so as to enable the first pixel unit within a second time period following the first time period; and inputting a display signal to the data line, so as to provide a first displayed level to the second pixel unit and the third pixel unit within the first time period and provide a second displayed level to the first pixel unit within the second time period.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1A:
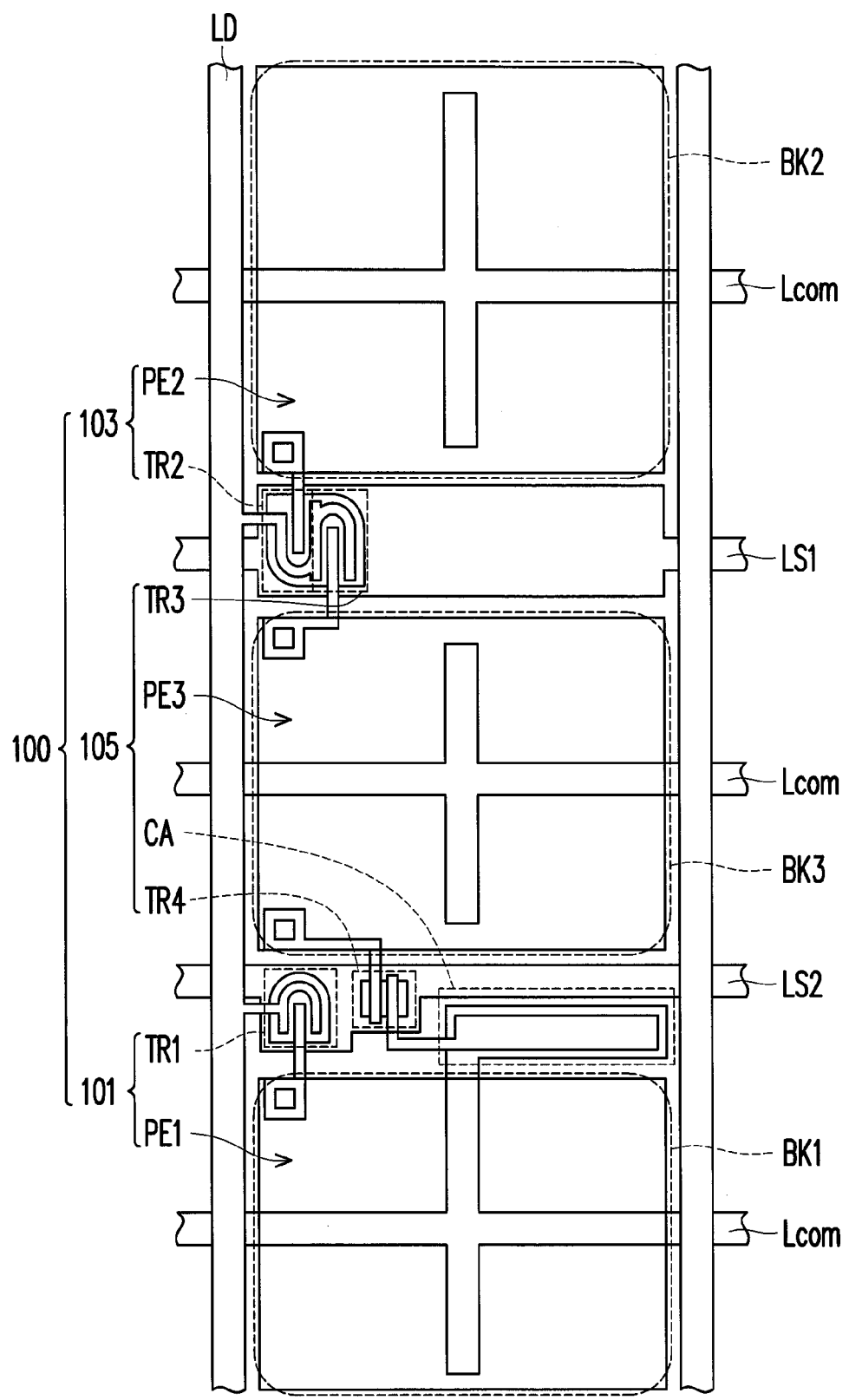
FIG. 1A is a schematic view illustrating a structure of a pixel circuit according to an embodiment of the invention.

FIG. 1A is a schematic view illustrating a structure of a pixel circuit according to an embodiment of the invention. Please refer to FIG. 1A. In the present embodiment, it is assumed that each pixel circuit (e.g., a pixel circuit 100) is electrically coupled to two scan lines (e.g., a first scan line LS1 and a second scan line LS2) and one data line (e.g., a data line LD). In the present embodiment, the pixel circuit 100 includes a first pixel unit 101, a second pixel unit 103, and a third pixel unit 105, configured to display a same color. The first pixel unit 101 at least includes a first active device (e.g., a transistor TR1) and a first pixel electrode PE1; the second pixel unit 103 at least includes a second active device (e.g., a transistor TR2) and a second pixel electrode PE2; the third pixel unit 105 at least includes a third active device (e.g., a transistor TR3), a fourth active device (e.g., a transistor TR4), a third pixel electrode PE3, and a capacitor CA.

Figure 1B:
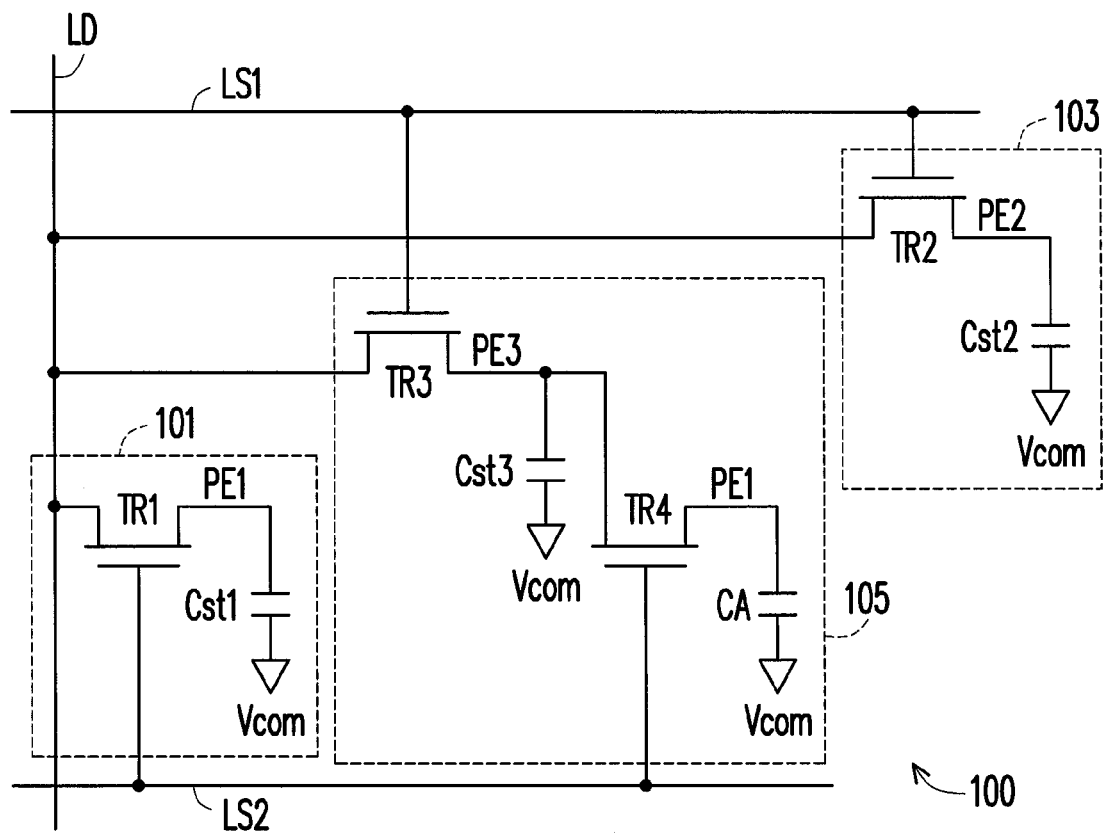
FIG. 1B is a schematic circuitry diagram illustrating the pixel circuit depicted in FIG. 1A according to an embodiment of the invention.

FIG. 1B is a schematic circuitry diagram illustrating the pixel circuit depicted in FIG. 1A. With reference to FIG. 1A and FIG. 1B, in the present embodiment, the first pixel unit 101 further includes a first storage capacitor Cst1 formed by the first pixel electrode PE1 and a common electrode line Lcom (corresponding to a common voltage Vcom) collectively. In the first pixel unit 101, the transistor TR1 is electrically coupled to the second scan line LS2, the data line LD, and the first pixel electrode PE1 (equivalent to the first storage capacitor Cst1). That is to say, the drain of the transistor TR1 (corresponding to the first end) is electrically coupled to the first pixel electrode PE1, the source of the transistor TR1 (corresponding to the second end) is electrically coupled to the data line LD, and the gate of the transistor TR1 (corresponding to the third end) is electrically coupled to the second scan line LS2.

Based on the above, the voltage on the second scan line LS2 determines whether the transistor TR1 is turned on or turned off. As the transistor TR1 is turned on, a channel is formed in the transistor TR1, so as to provide the first pixel electrode PE1 with a level (i.e., a displayed level) of a display signal transmitted via the data line LD. After the first pixel electrode PE1 receives the displayed level, the displayed gray scale of the first block BK1 is determined according to the displayed level received by the first pixel electrode PE1. Therefore, the first pixel unit 101 described in the present embodiment determines the value of the displayed gray scale (i.e., the first displayed gray scale) of the first block BK1.

According to the present embodiment, the second pixel unit 103 further includes a second storage capacitor Cst2 formed by the second pixel electrode PE2 and the common electrode line Lcom collectively. In the second pixel unit 103, the transistor TR2 is electrically coupled to the first scan line LS1, the data line LD, and the second pixel electrode PE2 (equivalent to the second storage capacitor Cst2). That is to say, the drain of the transistor TR2 (corresponding to the first end) is electrically coupled to the second pixel electrode PE2, the source of the transistor TR2 (corresponding to the second end) is electrically coupled to the data line LD, and the gate of the transistor TR2 (corresponding to the third end) is electrically coupled to the first scan line LS1.

Based on the above, the voltage on the first scan line LS1 determines whether the transistor TR2 is turned on or turned off. As the transistor TR2 is turned on, a channel is formed in the transistor TR2, so as to provide the second pixel electrode PE2 with a level (i.e., a displayed level) of a display signal transmitted via the data line LD. After the second pixel electrode PE2 receives the displayed level of the display signal transmitted via the data line LD, the displayed gray scale of the second block BK2 is determined according to the displayed level received by the second pixel electrode PE2. Therefore, the second pixel unit 103 described in the present embodiment determines the value of the displayed gray scale (i.e., the second displayed gray scale) of the second block BK2.

According to the present embodiment, the third pixel unit 105 further includes a third storage capacitor Cst3 formed by the third pixel electrode PE3 and the common electrode line Lcom collectively. In the third pixel unit 105, the transistor TR3 is electrically coupled to the first scan line LS1, the data line LD, and the third pixel electrode PE3 (equivalent to the third storage capacitor Cst3). That is to say, the drain of the transistor TR3 (corresponding to the first end) is electrically coupled to the third pixel electrode PE3, the source of the transistor TR3 (corresponding to the second end) is electrically coupled to the data line LD, and the gate of the transistor TR3 (corresponding to the third end) is electrically coupled to the first scan line LS1. The transistor TR4 is electrically coupled to the second scan line LS2, the drain of the transistor TR3, and the capacitor CA. In other words, the drain of the transistor TR4 is electrically coupled to the capacitor CA, the source of the transistor TR4 is electrically coupled to the drain of the transistor TR3, and the gate of the transistor TR4 is electrically coupled to second scan line LS2.

Based on the above, the voltage on the first scan line LS1 determines whether the transistor TR3 is turned on or turned off, and the voltage on the second scan line LS2 determines whether the transistor TR4 is turned on or turned off. As the transistor TR3 is turned on, a channel is formed in the transistor TR3, so as to provide the third pixel electrode PE3 with a level (i.e., a displayed level) of a display signal transmitted via the data line LD. As the transistor TR4 is turned on, a channel is formed in the transistor TR4, such that the third pixel electrode PE3 is electrically coupled to the capacitor CA for adjusting the displayed level received by the third pixel electrode PE3. After the adjustment of the displayed level of the third pixel electrode PE3, the displayed gray scale of the third block BK3 is determined according to the adjusted displayed level received by the third pixel electrode PE3. Therefore, the third pixel unit 105 described in the present embodiment determines the value of the displayed gray scale (i.e., the third displayed gray scale) of the third block BK3.

Figure 2A:
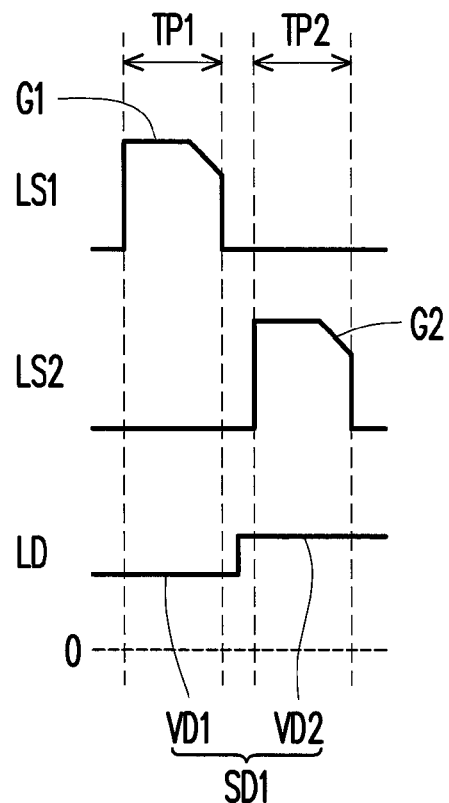
FIG. 2A is a schematic view illustrating a time sequence of a driving signal in the pixel circuit depicted in FIG. 1B when a 2D image is being displayed.
Figure 2B:
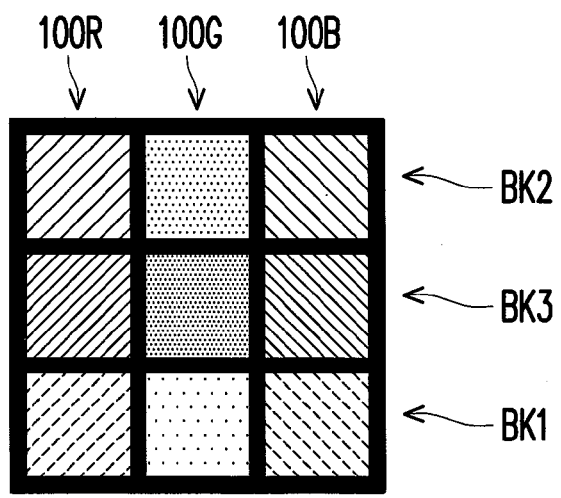
FIG. 2B is a schematic view illustrating a time sequence of a driving signal in the pixel circuit depicted in FIG. 1A when a 2D image is being displayed.

FIG. 2A is a schematic view illustrating a time sequence of a driving signal in the pixel circuit depicted in FIG. 1B when a 2D image is being displayed. FIG. 2B is a schematic view illustrating a time sequence of a driving signal in the pixel circuit depicted in FIG. 1A when a 2D image is being displayed. With reference to FIG. 1A, FIG. 1B, FIG. 2A, and FIG. 2B, within a first time period TP1, a first gate signal G1 is input to the first scan line LS1. The transistors TR2 and TR3 are turned on according to the first gate signal G1, and the transistors TR1 and TR4 are turned off. At this time, the second pixel unit 103 and the third pixel unit 105 are enabled, and the level of the displayed signal SD1 transmitted via the data line LD is the first displayed level VD1. The first displayed level VD1 is respectively provided to the second pixel electrode PE2 and the third pixel electrode PE3 via the transistor TR2 and the transistor TR3 that are both turned on.

Within a second time period TP2 following the first time period TP1, a second gate signal G2 is input to the second scan line LS2. The transistors TR1 and TR4 are turned on according to the second gate signal G2, and the transistors TR2 and TR3 are turned off. At this time, the first pixel unit 101 is enabled, and the level of the displayed signal SD1 transmitted via the data line LD is the second displayed level VD2 higher than the first displayed level VD1. The second displayed level VD2 is provided to the first pixel electrode PE1 via the transistor TR1 that is turned on. In addition, the third pixel electrode PE3 is electrically coupled to the capacitor CA via the transistor TR4 that is turned on. Due to electric charge sharing, the displayed level of the third pixel electrode PE3 is lowered down. Herein, the sum of the first time period and the second time period is substantially equal to a time period for a horizontal line. The time period for a horizontal line is defined as the active time of one data enable (DE) signal of the source driver.

To sum up, in each pixel circuit (e.g., a red pixel circuit 100R, a green pixel circuit 100G, and a blue pixel circuit 100B) described in the present embodiment, after the second time period TP2, the displayed level of the first pixel electrode PE1 is higher than the displayed level of the second pixel electrode PE2, and the displayed level of the second pixel electrode PE2 is higher than the displayed level of the third pixel electrode PE3. That is to say, the value of the displayed gray scale of the first block BK1 is greater than the value of the displayed gray scale of the second block BK2, and the value of the displayed gray scale of the second block BK2 is greater than the value of the displayed gray scale of the third block BK3. As such, the first block BK1, the second block BK2, and the third block BK3 can have different values of displayed gray scales, so as to resolve the color washout issue arising from displaying a 2D image.

Figure 3A:
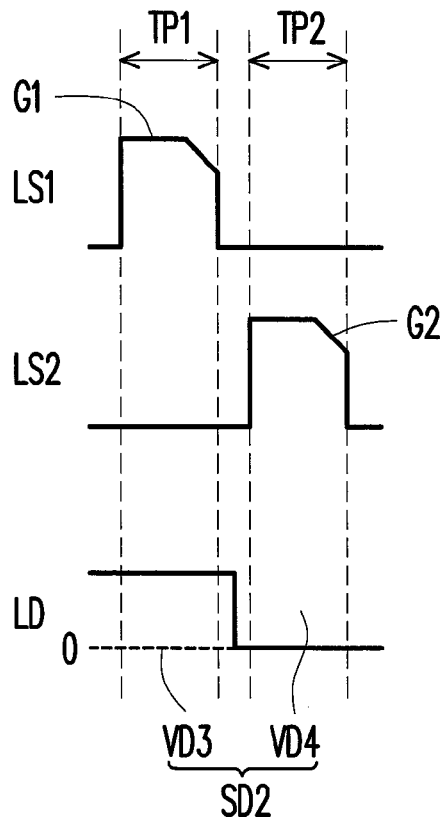
FIG. 3A is a schematic view illustrating a time sequence of a driving signal in the pixel circuit depicted in FIG. 1B when a 3D image is being displayed.
Figure 3B:
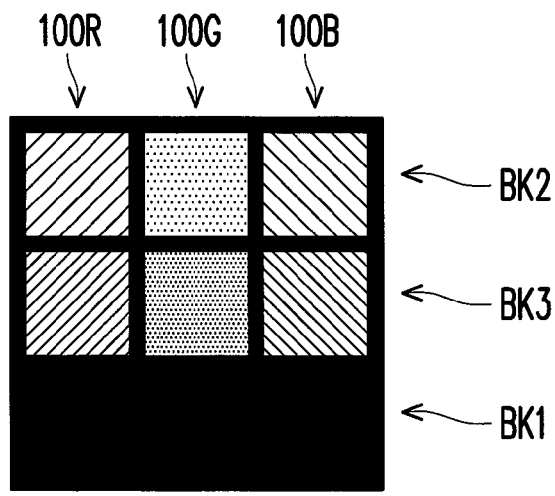
FIG. 3B is a schematic view illustrating a time sequence of a driving signal in the pixel circuit depicted in FIG. 1A when a 3D image is being displayed.

FIG. 3A is a schematic view illustrating a time sequence of a driving signal in the pixel circuit depicted in FIG. 1B when a 3D image is being displayed. FIG. 3B is a schematic view illustrating a time sequence of a driving signal in the pixel circuit depicted in FIG. 1A when a 3D image is being displayed. With reference to FIG. 1A, FIG. 1B, FIG. 3A, and FIG. 3B, within a first time period TP1, a first gate signal G1 is input to the first scan line LS1, so as to turn on the transistors TR2 and TR3 according to the first gate signal G1; here, the transistors TR1 and TR4 are turned off. At this time, the level of the displayed signal SD2 transmitted via the data line LD is the first displayed level VD3. The first displayed level VD3 is respectively provided to the second pixel electrode PE2 and the third pixel electrode PE3 via the transistor TR2 and the transistor TR3 that are both turned on.

Within a second time period TP2, a second gate signal G2 is input to the second scan line LS2, so as to turn on the transistors TR1 and TR4 according to the second gate signal G2; here, the transistors TR2 and TR3 are turned off. At this time, the level of the displayed signal SD2 transmitted via the data line LD is the second displayed level VD4 lower than the first displayed level VD3, and the second displayed level VD4 is provided to the first pixel electrode PE1 via the transistor TR1 that is turned on. The second displayed level VD4 is zero, for instance. In addition, the third pixel electrode PE3 is electrically coupled to the capacitor CA via the transistor TR4 that is turned on. Due to electric charge sharing, the displayed level of the third pixel electrode PE3 is lowered down.

To sum up, in each pixel circuit (e.g., a red pixel circuit 100R, a green pixel circuit 100G, and a blue pixel circuit 100B) described in the present embodiment, after the second time period TP2, the displayed level of the first pixel electrode PE1 is zero, and the displayed level of the second pixel electrode PE2 is higher than the displayed level of the third pixel electrode PE3. The second pixel electrode PE2 may be selectively placed on the edge of the pixel circuit 100. The displayed level of the first pixel electrode PE1 on the edge of the pixel circuit 100 is lower than the displayed level of the third pixel electrode PE3, and the displayed level of the first pixel electrode PE1 located on the edge of the pixel circuit 100 is substantially zero. Namely, the value of the displayed gray scale of the first block BK1 on the edge of the pixel circuit 100 is zero (i.e., the first block BK1 is in black), and the value of the displayed gray scale of the second block BK2 is greater than the value of the displayed gray scale of the third block BK3. As such, the second block BK2 and the third block BK3 can have different values of displayed gray scales, so as to resolve the color washout issue arising from displaying a 3D image. Besides, the displayed gray scale value of the first block BK1 is zero (i.e., the first block BK1 is in black), such that the first block BK1 can serve as a shielding block for curing the cross-talk problem occurring in adjacent pixels when a 3D image is displayed.

Figure 4:
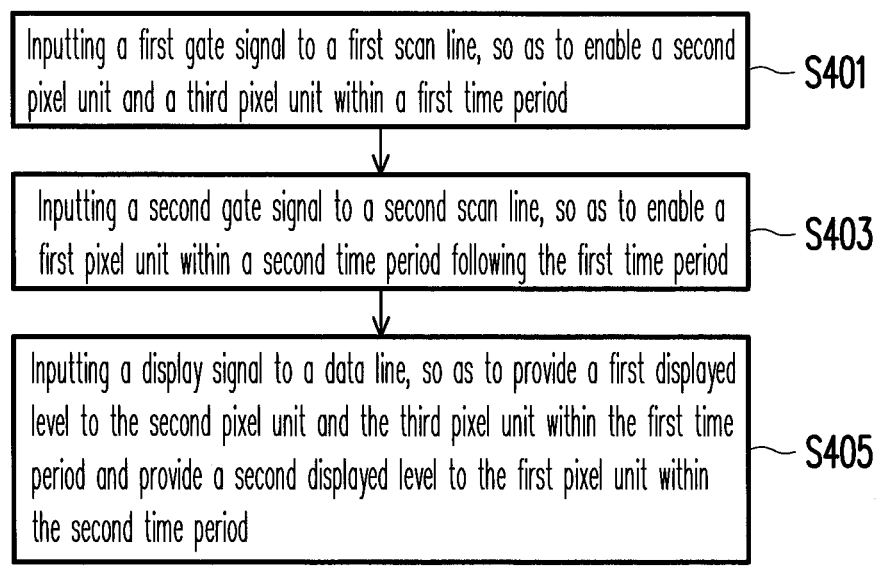
FIG. 4 is a flowchart illustrating a method for driving a pixel circuit according to an embodiment of the invention.

In view of the above, a method for driving a pixel circuit deduced, and the method is suitable for driving the pixel circuit 100 shown in FIG. 1A and FIG. 1B. FIG. 4 is a flowchart illustrating a method for driving a pixel circuit according to an embodiment of the invention. With reference to FIG. 1A, FIG. 1B, FIG. 2A, FIG. 2B, FIG. 3A, FIG. 3B, and FIG. 4, in step S401, the first gate signal G1 is input to the first scan line LS1, so as to enable the second pixel unit 103 and the third pixel unit 105 within the first time period TP1. In step S403, the second gate signal G2 is input to the second scan line LS2, so as to enable the first pixel unit 101 within the second time period TP2 following the first time period TP1.

In step S405, the display signal SD is input to the data line LD, so as to provide the first displayed level (e.g., VD1 or VD3) to the second pixel unit 103 and the third pixel unit 105 within the first time period TP1 and provide the second displayed level (e.g., VD2 or VD4) to the first pixel unit 101 within the second time period TP2. The order of said steps is merely exemplarily and should not be construed as a limitation to the invention. Besides, the detailed steps are already described in the embodiments shown in FIG. 1A, FIG. 1B, FIG. 2A, FIG. 2B, FIG. 3A, and FIG. 3C, and therefore no further description in this regard is provided hereinafter.

In light of the foregoing, a pixel circuit is provided herein. In the pixel circuit, a plurality of displayed levels are sequentially transmitted to the first pixel unit, the second pixel unit, and the third pixel unit via one single data line, and the first, second, and third pixel units respectively determine the displayed gray scales of the first, second, and third blocks. Thereby, no additional data line is required to resolve the color washout issue arising from displaying a 2D image, and the satisfactory aperture ratio (AR) of the pixel circuit can be guaranteed. Moreover, the displayed level of the first pixel electrode of the first pixel unit on the edge of the pixel circuit may be set to zero (i.e., black), and the difference in the displayed gray scales of the second and third blocks helps resolve the color washout issue arising from displaying a 3D image. Further, the first block can serve as a shielding block to overcome the cross-talk problem occurring in adjacent pixels when a 3D image is displayed.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A pixel circuit electrically coupled to a data line, a first scan line, and a second scan line, the pixel circuit comprising:
   a first pixel unit being electrically coupled to the data line and the second scan line and determining a first displayed gray scale of the first pixel unit, wherein the first pixel unit comprises:
   a first active device;
   a first pixel electrode electrically coupled to a first end of the first active device; and
   a first storage capacitor,
   wherein the first active device is electrically coupled between the data line and the first storage capacitor;
   a second pixel unit being electrically coupled to the data line and the first scan line and determining a second displayed gray scale of the second pixel unit, wherein the second pixel unit comprises:
   a second active device;
   a second pixel electrode electrically coupled to a first end of the second active device; and
   a second storage capacitor,
   wherein the second active device is electrically coupled between the data line and the second storage capacitor; and a third pixel unit being electrically coupled to the data line, the first scan line, and the second scan line and determining a third displayed gray scale of the third pixel unit, wherein the third pixel unit comprises:
- a third active device;
- a third pixel electrode electrically coupled to a first end of the third active device; and
- a third storage capacitor, wherein the third active device is electrically coupled between the data line and the third storage capacitor; and
- a fourth active device, wherein a first end of the fourth active device is electrically coupled to a common electrode line though the capacitor, and a second end of the fourth active device is electrically coupled to a first end of the third active device, wherein a first gate signal is input to the first scan line, so as to provide a first displayed level to the second pixel unit and the third pixel unit via the data line within a first time period, and a second gate signal is input to the second scan line, so as to provide a second displayed level to the first pixel unit via the data line and couple the third pixel unit to a capacitor within a second time period following the first time period.

2. The pixel circuit as recited in claim 1, wherein the first scan line is coupled to a third end of the second active device and a third end of the third active device and configured to turn on the second active device and the third active device within the first time period, the second scan line is coupled to a third end of the first active device and a third end of the fourth active device and configured to turn on the first active device and the fourth active device within the second time period following the first time period, and the data line is coupled to a second end of the first active device, a second end of the second active device, and a second end of the third active device.

3. The pixel circuit as recited in claim 1, wherein the first pixel electrode is located on an edge of the pixel circuit.

4. The pixel circuit as recited in claim 3, wherein the second pixel electrode is located on the other edge of the pixel circuit.

5. The pixel circuit as recited in claim 1, wherein the pixel circuit is configured to display a same color.

6. A driving method, adapted to drive a pixel circuit as claimed in claim 1, the pixel circuit is electrically coupled to a data line, a first scan line, and a second scan line, the pixel circuit includes a first pixel unit electrically coupled to the data line and the second scan line for determining a first displayed gray scale, a second pixel unit electrically coupled to the data line and the first scan line for determining a second displayed gray scale and a third pixel unit electrically coupled to the data line, the first scan line and the second scan line for determining a third displayed gray scale, the method comprising:

inputting a display signal to the data line, so as to provide a first displayed level to the second pixel unit and the third pixel unit within a first time period that a first gate signal is input to the first scan line, and provide a second displayed level to the first pixel unit within a second time period that a second gate signal is input to the second scan line, wherein the second time period is following the first time period, and the third pixel unit is coupled to a capacitor within the second time period.

7. The method as recited in claim 6, wherein the first displayed level is substantially lower than the second displayed level, a value of the first displayed gray scale is substantially greater than a value of the second displayed gray scale, and the value of the second displayed gray scale is substantially greater than a value of the third displayed gray scale.

8. The method as recited in claim 6, wherein the first displayed level is substantially higher than the second displayed level, a value of the second displayed gray scale is substantially greater than a value of the third displayed gray scale, and the value of the third displayed gray scale is substantially greater than a value of the first displayed gray scale.

9. The method as recited in claim 8, wherein the second displayed level is zero, and the value of the first displayed gray scale is zero.

10. The method as recited in claim 6, wherein the sum of the first time period and the second time period is substantially equal to a time period for a horizontal line.

11. The pixel circuit as recited in claim 1, wherein the second end of the fourth active device is directly connect to the first end of the third active device.

* * * * *